US009950875B2

(12) United States Patent
Walter et al.

(10) Patent No.: US 9,950,875 B2
(45) Date of Patent: Apr. 24, 2018

(54) DEVICE AND METHOD FOR DISTRIBUTING AND GROUPING CONTAINERS

(71) Applicant: KRONES AG, Neutraubling (DE)

(72) Inventors: Ralf Walter, Zeitlarn (DE); Stefan Elsperger, Söchtenau (DE); Michael Neubauer, Riedering (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/043,949

(22) Filed: Feb. 15, 2016

(65) Prior Publication Data

US 2016/0244271 A1 Aug. 25, 2016

(30) Foreign Application Priority Data

Feb. 20, 2015 (DE) .......................... 10 2015 203 042

(51) Int. Cl.
*B65G 47/71* (2006.01)
*B65B 21/06* (2006.01)
(Continued)

(52) U.S. Cl.
CPC ............ *B65G 47/715* (2013.01); *B65B 21/06* (2013.01); *B65G 15/22* (2013.01); *B65G 19/02* (2013.01);
(Continued)

(58) Field of Classification Search
CPC ........ B65G 15/22; B65G 19/02; B65G 19/22; B65G 47/088; B65G 47/32; B65G 47/715;
(Continued)

(56) References Cited

U.S. PATENT DOCUMENTS 3,481,107 A 12/1969 Andblad et al.
4,411,353 A * 10/1983 McDole ............... B65G 47/841
198/419.3
(Continued)

FOREIGN PATENT DOCUMENTS

DE 4134735 A1 4/1993
DE 4134438 C2 11/1994
(Continued)

OTHER PUBLICATIONS

European Search Report for Application EP 16 15 5789, dated Jun. 24, 2016.
(Continued)

*Primary Examiner* — Leslie A Nicholson, III
*Assistant Examiner* — Keith R Campbell
(74) *Attorney, Agent, or Firm* — Marshall, Gerstein & Borun LLP

(57) ABSTRACT

A device for distributing and grouping containers in a container treatment assembly, including an infeed conveyor which is configured to convey a plurality of containers in a single-lane infeed flow; an outfeed conveyor which is configured to convey the containers away in multiple lanes; and a transfer conveyor associated with the infeed and the outfeed conveyor and having a plurality of circulating guide elements for the containers; where the transfer conveyor is adapted to separate the containers in a standing position by way of the circulating guide elements from the single-lane infeed flow to the multi-lane outfeed flow by selective guiding, in particular, by pushing them forward and/or decelerating them.

25 Claims, 11 Drawing Sheets

(51) Int. Cl.
*B65G 47/08* (2006.01)
*B65G 47/84* (2006.01)
*B65G 54/02* (2006.01)
*B65G 15/22* (2006.01)
*B65G 19/02* (2006.01)
*B65G 19/22* (2006.01)
*B65G 47/32* (2006.01)

(52) U.S. Cl.
CPC ........... *B65G 19/22* (2013.01); *B65G 47/088* (2013.01); *B65G 47/32* (2013.01); *B65G 47/841* (2013.01); *B65G 54/02* (2013.01); *B65G 2201/0244* (2013.01)

(58) Field of Classification Search
CPC .................. B65G 47/841; B65G 54/02; B65G 2201/0244
See application file for complete search history.

(56) References Cited

U.S. PATENT DOCUMENTS

| | | | |
|---|---|---|---|
| 4,697,691 A | 10/1987 | Zodrow et al. | |
| 7,416,072 B2 * | 8/2008 | Gosset | B65G 47/715 198/429 |
| 7,591,363 B2 | 9/2009 | Wild et al. | |
| 9,045,291 B2 | 6/2015 | Konrad et al. | |
| 9,540,127 B2 * | 1/2017 | Papsdorf | B65B 35/44 |
| 9,682,829 B2 * | 6/2017 | Keil | B65G 47/71 |
| 2008/0289930 A1 | 11/2008 | Fischer | |
| 2015/0078876 A1 * | 3/2015 | Michler | B65H 31/3081 414/789.1 |

FOREIGN PATENT DOCUMENTS

| | | | | |
|---|---|---|---|---|
| DE | 29517091 U1 | 12/1995 | | |
| DE | 20002411 U1 | 6/2001 | | |
| DE | 102004048515 A1 | 4/2006 | | |
| DE | 102004048515 A1 * | 4/2006 | ............ | B07C 5/122 |
| DE | 102006025090 B3 | 8/2007 | | |
| DE | 102008051919 A1 | 4/2010 | | |
| DE | 102011014495 A1 * | 9/2012 | ............ | B65G 47/088 |
| DE | 102011014495 A1 | 9/2012 | | |
| DE | 102011076864 A1 | 12/2012 | | |
| DE | 102012201059 A1 | 7/2013 | | |
| DE | 102013106742 A1 | 12/2014 | | |
| DE | 102013107565 A1 | 1/2015 | | |
| DE | 102013107565 A1 * | 1/2015 | ............ | B65G 47/71 |
| EP | 1882651 A1 | 1/2008 | | |
| EP | 2500296 A1 | 9/2012 | | |
| NL | 6700965 A | 7/1967 | | |
| WO | WO-2006079553 A1 | 8/2006 | | |
| WO | WO-2009114332 A2 | 9/2009 | | |
| WO | WO 2016102117 A1 * | 6/2016 | ............ | B65G 47/08 |

OTHER PUBLICATIONS

German Search Report for Application No. 102015203042.3, dated Nov. 16, 2015.

* cited by examiner

DEVICE AND METHOD FOR DISTRIBUTING AND GROUPING CONTAINERS

CROSS-REFERENCE TO RELATED APPLICATION

The present application claims priority to German Patent Application No. 102015203042.3, filed Feb. 20, 2015. The priority application, DE 102015203042.3, is hereby incorporated reference.

FIELD OF THE INVENTION

The present invention relates to a device and a method for distributing and grouping containers, in particular bottles, in a container treatment assembly.

PRIOR ART

Containers to be treated are in container treatment assemblies, for example, in the beverage industry, often redistributed or regrouped to create, for example, a plurality of parallel container flows or container packs to be processed. Container transport between a labeling machine and a disposable goods packer for producing packs follows, for example, the following procedure: Downstream of the labeling machine, the containers are usually transported in a single row where faulty containers are removed from the container flow. After the containers have been decelerated by the conveyor belts used by way of multiple speed reductions, the single-row formation is dissolved so that disorderly mass transport arises. The containers are from this mass transport ultimately distributed by squeezing into lanes and by the containers accumulating in the individual lanes, where container pre-grouping is done by a so-called container spacer. The pre-grouped containers can subsequently be supplied to a disposable goods packer to create packs of containers, for example, in the form of beverage crates.

However, the method described above for distributing and grouping containers has a number of drawbacks in terms of process reliability. There is for instance a risk of tilting due to the frictionally-induced reduction in speed of the containers by way of the conveyor belts. Squeezing into the lanes is also a problem for soft containers or sticky recycled PET containers, where non-pressure-resistant soft containers can generally not be transported well when back pressure arises. Transporting the containers under back pressure like in the disorderly mass transport described above also frequently leads to the labels that are applied to the containers being damaged and is generally not feasible with shaped containers such as rectangular PET containers or those made of soft paperboard. Furthermore, changing over to another container format is often cumbersome and error-prone, where long start-up times must be taken into account due to the partially high complexity. In addition, the device described requires a large space.

The present invention is therefore based on the object to provide a device and a method for distributing and grouping containers which avoids the aforementioned drawbacks. The flexibility of the assembly in terms of a product change and process reliability is in particular to be increased. In addition, the space required by the assembly is to be reduced in order to save installation costs.

DESCRIPTION OF THE INVENTION

The above objects are satisfied by a device for distributing and grouping containers in a container treatment assembly, comprising: an infeed conveyor which is configured to convey a plurality of containers in a single-lane infeed flow; an outfeed conveyor which is configured to convey the containers away in multiple lanes; and a transfer conveyor associated with the infeed and the outfeed conveyor and having a plurality of circulating guide elements for the containers; where the transfer conveyor is adapted to separate the containers in a standing position by way of the circulating guide elements from the single-lane infeed flow to the multi-lane outfeed flow by selective guiding, in particular, by pushing them forward and/or decelerating them.

The containers can be cans, glass bottles or other glass containers with lids, plastic bottles, for example, made of PET, shaped containers such as e.g. rectangular PET containers, containers made of paperboard or the like. In particular, containers of different sizes, cross-sections and/or different weights can be distributed and grouped with the device according to the invention.

Distributing and optionally grouping the containers is there effected by way of the transfer conveyor according to the invention in cooperation with the outfeed conveyor. The device according to the invention for this purpose comprises an infeed conveyor which is configured to feed the transfer conveyor a plurality of containers in a single-lane infeed flow. The containers can depending on the configuration of the infeed conveyor be conveyed either with a fixed or variable division or back-to-back. The infeed conveyor can comprise the conveyor belt described farther below on which the containers are conveyed in a standing position, a lane operated by back pressure, a transport path driven by a belt or linear motor drive, a transfer screw or a star wheel, for example, as an outfeed star of a rotary machine. The containers can upstream of the infeed conveyor be conveyed preferably in a standing position.

However, the containers can alternatively also be conveyed being suspended, for example, by way of neck handling for bottles, as long as a transfer zone for delivering the containers to the transfer conveyor is provided in which the containers are moved in a standing position. Such a transfer zone can be given as a transfer plate or part of a conveyor belt. The single-lane container flow can prior to being supplied to the transfer conveyor optionally be spread into a desired separation, for example, by providing an infeed worm. Such separation can, for example, be desired fort he reason that the transfer conveyor described below in more detail can received more than one container simultaneously from the infeed flow.

The transfer conveyor can be adapted to receive the containers individually or in groups from the infeed flow. Receiving the containers is presently and hereinafter to be understood as assuming control of container transportation, in particular in terms of speed and direction. According to the present invention, the transfer conveyor is configured such that it distributes the containers in a standing position by selective guiding by use of a plurality of circulating guide elements for the containers from the single-lane infeed flow to the multi-lane outfeed flow. The guide elements can for this purpose in particular all be formed the same and be designed such that the circulating guide elements can be made to engage with the containers to be received in order to receive one or more containers from the infeed flow. The shape and arrangement of the guide elements there depends on the types of containers to be transported and the mode of transportation in the infeed conveyor, but can be selected such that a plurality of different types of containers and sizes can be transported without changing any format components. The transfer conveyor is further configured such that the plurality of guide elements circulate along one or more specified tracks, where the transfer conveyor is arranged relative to the infeed conveyor and the outfeed conveyor such that the guide elements can receive the containers from the infeed conveyor and guide them to the outfeed conveyor. The infeed conveyor, the transfer conveyor and the outfeed conveyor are there configured and arranged relative to each other such that the containers are transported in a standing position at least between being received from the infeed flow and delivered to the outfeed flow.

The transfer conveyor can be disposed in part or entirely between the infeed conveyor and the outfeed conveyor, where there is a partial overlap between the transfer conveyor and the infeed conveyor and the outfeed conveyor, respectively, for receiving and delivering the containers, respectively. The transfer conveyor is arranged relative to the outfeed conveyor such that the containers are along at least a portion of the transfer path conveyed at an acute angle relative to the conveying direction of the outfeed conveyor when the containers are delivered to the outfeed conveyor.

The outfeed conveyor is according to the invention adapted to convey the container away in multiple lanes after they have been delivered by the transfer conveyor. The number and spacing of conveying lanes can there be selected depending of the desired grouping. If e.g. four-lane grouping is desired, for example, to create four-lane packs of containers, then the outfeed conveyor should have at least four conveying lanes, where also more conveying lanes can be possible to allow for different pack sizes. The conveying lanes can be designed as separate conveyor belts or as conveying lanes on a common conveyor belt.

The transfer conveyor is now adapted to selectively guide the containers received from the infeed flow to the respectively desired conveying lane, where the one or more guide elements respectively being in engagement with the containers accomplish this guiding. The guide elements can for this purpose guide the containers actively by pushing them to the desired conveying lane. Alternatively or additionally, the guide elements can selectively decelerate the containers being moved by the transport mechanism as needed until they have arrived at the respectively desired conveying lane. The transport mechanism can be given, for example, by the one or more conveyor belts of the outfeed conveyor or one or more conveyor belts of the transfer conveyor, as long as the containers are transported on the belt or a slide surface in a sanding position. In any case, a force is by mechanical engagement of the respective guide element exerted upon the container to be guided which is directed and dimensioned such that the container received from the infeed flow is moved to the desired conveying lane. The transfer and the outfeed conveyors are there configured such that this force can again be canceled after delivery of the container to the desired conveying lane For this purpose, e.g. the mechanical engagement can be cancelled and/or the current speed of the guide element can be changed. A release mechanism as described below for releasing the container is also conceivable.

Selective guidance to the desired conveying lane can be effected in particular by way of a control and/or regulating unit of the transfer conveyor which, for example, activates said release mechanism and/or controls the speed of the guide elements. The control and/or regulating unit can further be adapted to also control transportation of the containers in the infeed flow and/or the outfeed flow. Smooth cooperation between the infeed, the outfeed and the transfer conveyors can thereby be ensured.

According to one further development, the infeed conveyor can comprise a conveyor belt for single-lane transportation of containers and/or the outfeed conveyor at least one conveyor belt, in particular a plurality of conveyor belts arranged in parallel for multi-lane transportation of containers. The containers can be transported on the conveyor belt of the infeed conveyor in a standing position at a predetermined distance or back-to-back. As already mentioned, the containers transported on the conveyor belt of the infeed conveyor are received individually or in groups by the guide elements of the transfer conveyor to selectively guide the containers to the respective conveying lanes of the outfeed conveyor. The process of receiving by the guide elements is presently and hereinafter to be understood such that the guide elements are made to mechanically engage the containers to be guided. The actual transport of the container can there at least in part be effected by the guide elements, but does not need to be. Further developments are also conceivable in which the actual transport of the containers is at least in part accomplished by one or more conveyor belts of the outfeed conveyor and/or of the transfer conveyor while the guide elements influence only the direction and/or the speed of movement of the containers on the way from the single-lane infeed flow to the multi-lane outfeed flow. According to this development, the outfeed conveyor comprises at least one conveyor belt for conveying containers away in multiple lanes. The conveying lanes can there be arranged side by side on the same conveyor belt. Alternatively, multiple conveyor belts parallel to each other can be provided in the outfeed flow for transporting the containers in multiple lanes. The conveyor belts of the infeed, the outfeed and possibly the transfer conveyors are there configured and arranged relative to each other such that the containers can be pushed in a standing position from the conveyor belt of the infeed conveyor to the one or more conveyor belts of the outfeed conveyor. The conveyor belts can in particular be arranged in a horizontal plane.

According to one further development, the transfer conveyor can comprise a long-stator linear motor drive with a plurality of individually and independently movable conveying devices and/or a belt or chain drive.

In the case of a long-stator linear motor drive, the transfer conveyor comprises a plurality of individually movable conveying devices. Individual and independent movement there relates to both the position and the speed of the conveying devices. The conveying devices are there configured such that they can transport one or more containers with an individual distance-time profile along a predetermined transport path between the reception from the infeed conveyor and the delivery to the outfeed conveyor. The conveying devices can in particular be configured as carriages or runners which each comprise one or more guide elements for guiding the containers. With a long-stator linear motor drive, as it is known per se from art, the conveying devices are with their guide elements moved individually and independent of each other by magnetic interaction with one or more long stators. For defining the respective distance-time profile of the conveying devices, and thereby the guided containers, the transfer conveyor according to the invention can comprise a control and/or regulating device which actuates the conveying devices and/or the linear motor drive accordingly. The number of conveying devices can be selected according to the desired container throughput of the transfer conveyor and in dependence of a length of the transport path. In general, at least a sufficient number of conveying devices are provided such that the incoming containers can without delay be distributed among the outfeed conveying lanes.

The plurality of conveying devices with their respective guide elements according to the present invention pass along a transport track of the transfer conveyor. The shape of this transport track is there basically arbitrary, as long as a portion of the transport track is arranged between the infeed conveyor and the outfeed conveyor such that the containers can be received from the infeed flow by the guide elements and distributed to the outflow conveying lanes. The transport tracks can in particular be substantially closed, wherein substantially closed means that the respective transport track has at least one closed path for the respective plurality of conveying devices. This can be achieved, for example, by providing a return path as part of the transport track, where the return path enables returning conveying devices to the infeed conveyor after delivery of the containers to the outfeed conveyor. In addition to a main line, one or more branch lines are there possible which are connected to the main line by way of track switches (see below). The conveying devices are not only returned to the infeed conveyor along the return path, but can also be buffered there should gaps in the infeed flow of containers arise. Furthermore, not the entire respective transport track must be equipped with the linear motor drive for the conveying devices. Alternatively, the return path can be equipped, for example, with a continuous drive such as a conveyor strap or the like.

Since the conveying devices and therefore the guide elements can be moved individually and independently of each other in such a manner, successive containers can be transported with any separation distance in the conveying direction along the transport path of the transfer conveyor. The containers can in particular there be accelerated and/or decelerated as needed according to a predetermined distribution plan in for distributing them to the outfeed conveying lanes.

Also any gaps in the incoming flow of containers can be closed by appropriately accelerated guiding of the one or more trailing containers or delayed guiding of the leading one or more containers, so that a gapless outfeed flow can always be formed. With a transfer conveyor comprising a long-stator linear motor drive, the transport path or the transfer path, respectively, located between the infeed conveyor and the outfeed conveyor can be straight or curved at least in part. The infeed conveyor and the outfeed conveyor can then be located in one line. Guiding the containers by way of a long-stator linear motor drive is just like guiding by way of a belt or chain drive described below effected in that the containers to be guided stand on a conveying surface, where this conveying surface can in particular be a conveyor belt of the outfeed conveyor or of the transfer conveyor. For guiding the conveying devices of the long-stator linear motor drive along the respective transport track, the transport track can comprise, for example, at least one guide rail and/or a guide channel. Accordingly, the conveying devices can comprise at least one complementary guide channel, a guide pin and/or one or more suitably arranged guide rollers which run, e.g. by use of a wheel flange, on the guide rail of the transport track. A plurality of alternative embodiments, e.g. by way of sliding bearings, is there conceivable. Low-friction guiding of the conveying devices along the transport track can be enabled by providing a guide rail at the transport track. Moreover, the transport track can comprise a running surface along which respective support members, e.g. support rollers, can roll or slide. Furthermore, the transport track can comprise at least one sensor for determining the position of the conveying devices along the transport track. In particular, by regular and periodic arrangement of sensors along at least a section of the transport track, the position of a conveying device can be determined in this section of the transport track. Alternatively, determining the position of the conveying devices can also be realized without additional sensors, for example, by way of sensorless regulating of the conveying devices (ELC—Encoderless Control). Sensors can be formed as optical sensors, electrical sensors, electromagnetic sensors or mechanical sensors. Such sensors can be provided upstream from where the containers are received from the infeed flow, for example, to achieve synchronization of the movement of the conveying devices, i.e. the guide elements, to the movement of the containers to be received. Thereby and by suitably arranging the transport track to the infeed conveyor, individual containers or groups of containers can be received selectively from the infeed flow.

According to the present development, the transport track and the conveying devices of the long-stator linear motor drive are configured such that the conveying devices can be guided individually along the transport path. This means that the conveying devices each comprise at least one response element which by way of electromagnetic interaction with interaction elements disposed along the transport track experiences a force with which the conveying devices can be accelerated and thereby moved. By selectively actuating the response element of a particular conveying device and/or one or more interaction elements in a limited region of the transport track, this application of force can be limited to a particular conveying device, whereby the conveying device can be guided individually and independently of other conveying devices along the transport track.

Transport systems with a linear motor drive are well known in prior art. All transport systems with a linear motor drive have in common that transport elements or conveying devices configured specifically for this are due to magnetic interaction with the one or more long stators or linear motor trains of one or more linear motors moved along one or more guide rails.

In the case of using a linear motor drive for guiding the containers in the direction of the transfer conveyor, the conveying devices and at least the part of the respective transport track along the transport path are formed such that the conveying devices can be moved in the region of the transport path by way of a magnetic force, preferably in interaction with the transport track. The respective section of the transport track can in particular be equipped with a magnetic linear drive, for example, in the form of a synchronous or asynchronous linear motor. For this purpose, the respective section of the transport track is equipped with a plurality of electrical windings in the form of individually actuateable electromagnets. In order to create magnetic interaction between the conveying device and the individually actuateable electromagnets of the transport track, the conveying device can be fitted with one or more permanent magnets or non-switching electromagnets or iron cores.

In one embodiment, the conveying device can be embodied as a passive conveying device which is moved by interaction with the electromagnetic alternating fields generated by the individually actuateable electromagnets of the transport track. The at least one permanent magnet or non-switching electromagnet or iron core of the conveying device therefore forms the above-mentioned response element, while the individually actuateable electromagnets of the transport track form the above-mentioned interaction elements. A locating unit involves using passive conveying devices preferably attached at the transport track in order to determine the position of at least one conveying device and preferably of all conveying devices and to pass it to a controller of the electromagnets of the transport track. The locating unit can be realized in particular by the above-described sensors. The strength of current through the electrical windings of the transport track can be adjusted automatically by the controller depending on the power demand by the conveying device to be moved. By individually controlling the strength of current through individual windings of the transport track, the conveying device can further be accelerated, decelerated or moved at a uniform predetermined speed.

In an alternative embodiment, the conveying device as an active conveying device provided with electrical windings which can apply the magnetic alternating fields necessary for the drive. Accordingly, the section of the transport track is provided with permanent magnets or non-switching electromagnets. Both the electrical energy necessary for the drive as well as the signals necessary for the controller can there be transferred by induction transmission to the individual conveying devices. The controller can therefore be located decentralized on the individual conveying devices or also be centrally housed in a separate control unit. In an alternative thereto, the necessary electrical energy can be transmitted to the conveying devices via a lead disposed along the transport track. Furthermore, a combination of an embodiment of the conveying device as an active conveying device with a transport track having individually actuateable electromagnets is conceivable.

For using a linear motor drive, the respective transport track can comprise one or more linear drive trains which are configured as long stators of, in particular, synchronous linear motors. In an alternative embodiment, the linear drive trains can also be formed as asynchronous linear motors, where the at least one permanent magnet and/or the non-switching electromagnet of the response element of the conveying device and/or an electrically conductive element of the conveying device, e.g. in the form of a metal plate to which the permanent magnet and/or non-switching electromagnet are mounted, serve as electrical conductors for the induction by the asynchronous linear motors.

In addition to the above-described section of the transport track formed as a magnetic path along the transfer path between the reception point and the delivery point, the transport track can outside the transfer path further comprises at least one section of the path, for example, the return path, along which the conveying devices are moved at a uniform speed. The section of the path can for this purpose comprise a drive device in the form of a conveyor belt, a conveyor chain, or the like. By combining a transport path with a magnetic drive and a return path with a mechanical drive, installation costs for the entire transfer conveyor can be lowered.

The conveying device can in a development be supported fully magnetically or partly magnetically and partly mechanically or fully mechanically at the transport track. With a fully magnetic support, the above-described section of the transport track is configured as a magnetic levitation track, where electrical windings are provided in the transport track and/or the conveying device and cause magnetic levitation of the conveying device above the transport track. This allows the friction between the conveying device and the transport track to be reduced to a minimum. With a partly magnetic and partly mechanical support, the conveying device can additionally comprise one or more support elements, for example, in the form of support rollers and/or guide rollers. The additional support elements there roll or slide on a running surface or guide rail of the transport track. With fully mechanical support, the conveying device can be supported solely by the at least one support element described. Additionally or alternatively, the support can also be effected pneumatically, where the transport track is in the respective partial section configured as an air suspension track. With a pneumatic support, minimum friction arises between the conveying device and the transport track just like with the fully magnetic support.

The transfer conveyor can further comprise a control and/or regulating device, in particular a process computer, for controlling the at least one conveying device. The control and/or regulating device can there be realized by a central control unit and/or by decentralized control units arranged on the conveying devices. The one or more control units can be configured such that they control and/or regulate the electric windings of the transport track and/or the conveying devices individually such that the conveying devices guide the containers received by way of the guide elements selectively to the respective outfeed conveying lane.

Alternatively or additionally, the transfer conveyor can comprise a belt or chain drive, for example, in order to return the unladen conveying devices—as described above—along the return path to the reception point at the infeed conveyor. At the cost of less flexibility, however, guiding the containers along the transport path can also be accomplished by a belt or chain drive. The plurality of guide elements for receiving the containers from the infeed flow at a uniform distance from each other are arranged at the conveyor belt or the transport chain such that they, with an appropriate circulation speed of the conveyor strap or the transport chain, immerse into the incoming flow of containers and engage between the containers of the infeed flow such that the latter are guided to the outfeed conveyor by way of mechanical contact with the guide elements.

Regardless of whether the guide elements are provided as part of individually movable conveying devices of a long-stator linear motor drive or are driven by a belt or chain drive, the guide elements can each have at least one, in particular controllably lockable and/or controllably unlockable stop element which is adapted such that it can by mechanical engagement with at least one container be used for decelerating this container. The stop element can there be configured according to the shape and size of the containers to be guided, for example, as a stop plate or as a stop bar, and in particular be configured such that tilting of the guided container during deceleration can be prevented. In addition, the stop element can be configured such that containers of different size and/or shape can be reliably guided without changing the stop element. In order to be able to deliver the guided containers selectively to the desired conveying lanes of the outfeed conveyor, the stop element can be optionally equipped with a locking mechanism, for example, in the form of a rotary catch. After the stop element immerses into the gap between two consecutive containers of the infeed flow, this locking mechanism can be operated, for example, by way of a stationary cam to protect the received container from slipping out from the guide element. Once the container has arrived at the desired conveying lane, the locking mechanism can be opened, for example, by way of a stationary and switchable cam to release the container. The stop element can be employed particularly advantageously in combination with a conveyor belt of the transfer conveyor or the outfeed conveyor, respectively, which is operated at such a speed that the containers conveyed by the conveyor belt are driven against the stop element. By suitable speed of the guide element relative to the conveyor belt, the guided containers can be distributed selectively to the outfeed conveying lanes, where groups of containers can simultaneously be formed.

In the case that the transfer conveyor comprises the long-stator linear motor drive, the guide elements can alternatively or additionally each comprise at least one push element which is configured such that it can by mechanical engagement with at least one container be used to push forward this container in a laterally stable manner.

The push element can be formed depending on the shape and/or size of the containers to be guided such that the containers to be guided can in a laterally stable manner, i.e. without lateral slipping or tilting, be pushed from the reception point to the delivery point. Here as well, formation of push elements is possible which can guide containers of different shapes and sizes in a laterally stable manner. The containers can by way of the long-stator linear motor drive be pushed over a conveyor surface at a desired speed by mechanical contact with the push elements. For example, the containers can at the respective points be moved selectively from a conveyor belt of the infeed conveyor onto conveyor belts of the outfeed conveyor being arranged adjoining this conveyor belt in parallel.

According to a particular development, the transfer conveyor can further comprise a plurality of controllable track switches connecting a main line of the transfer conveyor to a plurality of branch lines associated with the outfeed container lanes. In this development, the transport track of the long-stator linear motor drive in addition to the main line comprises a plurality of branch lines which are connected to the main line via track switches. Conveying devices, and with them the guided containers, can via these track switches be selectively channeled to the branch lines that are associated with the respectively desired conveying lane to which the container is to be guided. After the containers have been delivered, the now unladen conveying devices are via further track switches reintroduced into the main line of the transport track and then returned to the infeed conveyor.

According to a further development, the transfer conveyor can further comprise at least one section of the path which intersects the outfeed conveyor, i.e. its conveying lanes, at an angle $\alpha$ which is greater than 0° and smaller than 90°, where the angle $\alpha$ is in particular represented approximately by the formula $\cos \alpha = v_{out}/v_{trans}$ with a uniform conveying speed $v_{out}$ of the containers in the outfeed flow and a uniform conveying speed $v_{trans}$ of the containers along the section of the path of the transfer conveyor. The section of the path can there comprise the entire above-described transport path between the reception point for receiving the container from the infeed conveyor and the (last) delivery point for delivering the containers to the outfeed conveyor, or only the part of the transport path in the region of the delivery points. According to this development, this section of the path intersects the outfeed conveyor at an acute angle $\alpha$. In such an arrangement, the containers guided by the transfer conveyor can be selectively guided to the respective outfeed container lanes in that they are, for example, by use of the guide elements guided accordingly at an angle over the group of parallel conveying lanes to then be released at the desired conveying lane. If one predetermines a uniform conveying speed $v_{out}$ of the containers in the conveying lanes of the outfeed flow and further a uniform conveying speed $v_{trans}$ of the containers along the section of the path of the transfer conveyor, then successive containers can be distributed to the conveying lanes such that they can be outfed already grouped when this angle $\alpha$ is approximately given by the formula $\cos \alpha = v_{out}/v_{trans}$. "Approximately" in this context means that the angle fulfills the conditions mentioned subject to installation tolerances. At other angles, this grouping can be subsequently created, for example, by way of the development of the outfeed conveyor described below.

According to one embodiment, the outfeed conveyor can further comprise a pair of long-stator linear motor drives arranged parallel to each other with a plurality of conveying devices connected to each other in pairs by a cross member, in particular an impact bar. The linear motor drives thus arranged are there in terms of process technology disposed downstream of the region of the outfeed conveyor in which the containers are distributed to the conveying lanes, so that non-grouped containers can be consolidated to groups by selectively moving the pairs of conveying devices. For this, the containers not yet aligned in a line perpendicular to the conveying direction can be aligned by way of the cross member. For example, the containers being transported faster than the cross member by the one or more conveyor belts of the outfeed conveyor can run against these cross members and thereby be braked. On the other hand, trailing containers can by a cross member faster running be pushed until they are in line with the leading containers. For this, the pair-forming conveying devices of the linear motor drives can by way of a control and/or regulating unit be moved accordingly, also independently of each other. The transport tracks of the linear motor drives can for returning the conveying devices comprise return paths in a plane vertically offset relative to the transport plane of the containers. The cross members, in particular in the form of impact bars, can be configured such that tilting of the containers during grouping can be prevented. In addition, the cross members can be hingedly supported at the respective conveying devices, so that the conveying devices of the pairs can be temporarily moved at different speeds in order to cause an inclined position of the cross members with respect to the perpendicular direction of the conveying direction. If required, the cross members can be formed having variable lengths, for example, by way of a spring mechanism.

The above-mentioned objects are also satisfied by a method for distributing and grouping containers in a container treatment assembly, comprising the following steps: supplying a plurality of containers in a single lane to a transfer conveyor; conveying away the containers from the transfer conveyor in multiple lanes; and distributing the containers from the single-lane infeed flow to the multi-lane outfeed flow by way of the transfer conveyor; where distributing the containers is effected by selective guiding, in particular by pushing forward and/or decelerating the container transported in a standing position by way of a plurality of circulating guide elements of the transfer conveyor.

The same variations and developments which have been described above in connection with the device according to the invention can there also be applied to the method for distributing and grouping containers. The transfer conveyor can in particular be configured and arranged with respect to the infeed and outfeed conveyors such that the circulating guide elements each receive one or more containers from the infeed flow and can guide them selectively to the respectively desired conveying lane of the outfeed conveyor. For this purpose, the guide elements can be moved by way of a control and/or regulating unit in such a manner that they are in the region of reception of the containers moved in synchronism with the containers in the infeed flow. By approximating the guide elements to the infeed flow, they can then be brought to mechanically engage with the containers so that the transfer conveyor assumes control over transporting the containers, in particular their speed. Both in the infeed conveyor as well as in the outfeed conveyor, containers can be transported in a standing position with conveyor belts. While this is in the infeed conveyor according to the invention done in one lane, transportation in the outfeed conveyor is done in multiple lanes, depending on the desired container distribution or pack size, respectively. Multi-lane container transport can there, as described above, be effected by way of a single conveyor belt or a respective number of conveyor belts arranged in parallel.

Distributing the containers by way of the transfer conveyor is according to the invention performed in that the containers are by mechanical contact with the guide elements moved selectively to their desired outfeed conveying lanes. Movement of the containers in the region of the transfer path can there be generated by combining a forward push and/or deceleration of the containers by use of the guide elements with underlying transportation of the container, for example, by a conveyor belt of the transfer conveyor or the outfeed conveyor, respectively. For distributing the containers, they can in particular be pushed or guided transversely over the non-desired conveying lanes of the outfeed conveyor. After the containers have by canceling the mechanical contact with the guide elements been delivered to the outfeed conveying lanes, the now unladen guide elements are in circulation returned to the reception point.

In a further development, the containers can be separated when the containers are received from the infeed flow. This is particularly advantageous if the containers are to be fed individually to the desired conveying lanes. Separation of the containers can there be effected in particular by the guide elements themselves, or their mechanical engagement with the containers, respectively. The guide elements are there, as mentioned above, moved in synchronism with the containers in the infeed flow such that they, when approaching the infeed conveyor, immerse between two successive containers. By exerting a force via the guide elements onto the containers, the latter are thereby guided separately and can be selectively moved to a desired location.

According to one further development, the containers can be distributed by way of a long-stator linear motor drive with a plurality of individually and independently movable conveying devices and/or a belt or chain drive. The same developments and variations that have been previously described in connection with the linear motor drive can presently also be used. The conveying devices can in particular be moved in such an individual manner by way of a control and/or regulating unit of the transfer conveyor that their guide elements receive individual containers or groups of containers from the infeed flow and guide them specifically to the desired conveying lanes. Any gaps in the infeed flow can there be closed in that the conveying devices wait for the next container at the delivery point as needed. By accelerating the trailing conveying devices and/or decelerating the leading conveying devices, the gap can then again be closed. Though such flexibility is not given when using a belt or chain drive, the installation and operating costs, however, are reduced. Also the guide elements moved in circulation by way of the belt or chain drive can be synchronized with the containers in the infeed flow.

According to a particular development, the containers can be decelerated by mechanical engagement of at least one in particular controllably lockable and/or controllably unlockable stop element of the guide elements and/or be pushed forward by mechanical engagement of at least one push element of the guide elements. The guide elements are for decelerating there controlled in such manner that the containers run against the stop elements due to the transport speed of the conveyor belts on which they are transported in a standing position. Required for pushing forward are higher speeds of the guide elements as compared to the transport speed of the conveyor belts and/or a speed component transverse to the direction of the conveyor belts. By controlled locking and unlocking of the stop elements, the entrained containers can be reliably attached to the guide elements or released therefrom. Selective delivery of the containers to the outfeed conveying lanes can thereby be effected by releasing the lock. The controller of the locking mechanism can be realized, for example, by way of in particular switchable cams, a control curve, or electrical switching equipment.

According to a further development, some or all conveying devices can by a plurality of controllable track switches be channeled from a main line of the transfer conveyor to a plurality of branch lines associated with the outfeed container lanes. When channeling the conveying devices, the containers guided by them are entrained and guided to the respective conveying lanes. Selected distribution of containers to the container lanes can thereby be effected by controlled switching of the track switches, where the task of controlling the track switches can be assumed by the control and/or regulating unit of the transfer conveyor.

According to one development, the containers can be moved by the transfer conveyor for distributing the containers along a section of the path which intersects the outfeed conveying lanes or container lanes, respectively, at an angle $\alpha$ which is greater than 0° and smaller than 90°, where the angle $\alpha$ is in particular represented approximately by the formula $\cos \alpha = v_{out}/v_{trans}$ with a uniform conveying speed $v_{out}$ of the containers in the outfeed flow and at a uniform conveying speed $v_{trans}$ of the containers along the section of the path of the transfer conveyor. The containers are in this further development conveyed at uniform conveying speeds by the guide elements or the one or more conveyor belts of the outfeed conveyor The guided containers are at said angle therefore moved at precisely such speed obliquely to the conveying lanes that they during delivery to the conveying lanes form a line perpendicular to the conveying lanes and are thereby delivered in an already grouped manner to the outfeed conveyor.

Alternatively or additionally, the containers fed out in multiple lanes can by way of a pair of long-stator linear motor drives being disposed parallel to each other be grouped with a plurality of conveying devices connected to each other in pairs by a cross member, in particular an impact bar. The developments described above can be employed there as well. The conveying devices of the pairs of conveying devices can in particular by use of a control and/or regulating unit be controlled such that they align the containers transported in the parallel conveying lanes in one line by decelerating or pushing them. At least one of the two conveying devices of a pair can for this purpose temporarily be moved at a lower speed than the conveying speed of the conveying lanes, after the cross member has been positioned in front of the containers to be grouped. The containers thereby run against the cross-member and are braked until they form a line. In the region of the outfeed conveyor, the one or more conveyor belts can be provided as being split along the running direction such that a first belt portion is in the region of the deceleration path of the cross members driven at a first conveying speed, whereas the subsequent second belt portion is driven at an—in particular lower— target conveying speed of the decelerated containers. Coinciding with the operation of forming the line, several container rows can by the independently moveable cross members be pushed together or pre-grouped to form groups which correspond to the subsequent pack formation. The control and/or regulating unit there moves the pairs of conveying devices in such a manner that the cross member, in particular being oriented inclined to the perpendicular direction relative to the conveying direction, is ultimately oriented perpendicular to the conveying direction. The pairs of conveying devices are then moved on at the conveying speed. Conversely, the cross member can also be placed behind the containers to be oriented. At least one of the conveying devices of the pair of conveying devices is then by way of the control and/or regulating unit moved faster than the conveying speed, so that the containers are pushed onward from behind until they are aligned in one line. Here as well, the conveying devices are then moved on at the conveying speed. In this case as well, a two-part conveyor belt is conceivable, in which now, however, the target conveying speed of the pushed containers is higher than the first conveying speed of the first belt portion. In this manner, the containers delivered at the outfeed conveying lanes in a manner possibly offset relative to each other can be aligned and thereby grouped in one line perpendicular to the conveying direction. A downstream packing device, such as a disposable goods packer, can then push together the pre-grouped rows thus formed by way of a push bar system to the exact pack formation to form packs of containers. The device described for grouping the containers can further serve buffering containers, if there is a disturbance in the subsequent process.

The above-described devices and methods for distributing and grouping containers allow a plurality of different container types and sizes to be reliably distributed to multiple conveying lanes and grouped without damage to, for example, the labels applied. As the push elements and stop elements can be configured for a plurality of different container types and sizes, time-consuming change-over of format components in the event of a product change can be dispensed with. Moreover, the device described fulfills a buffer function.

Further features and embodiments as well as advantages of the present invention are by way of example illustrated below using the drawings. It is understood that the embodiments do not exhaust the scope of the present invention. It is further understood that some or all features described hereafter can also be combined with each other in different ways.

DETAILED DESCRIPTION OF THE PREFERRED EMBODIMENTS

Figure 1:
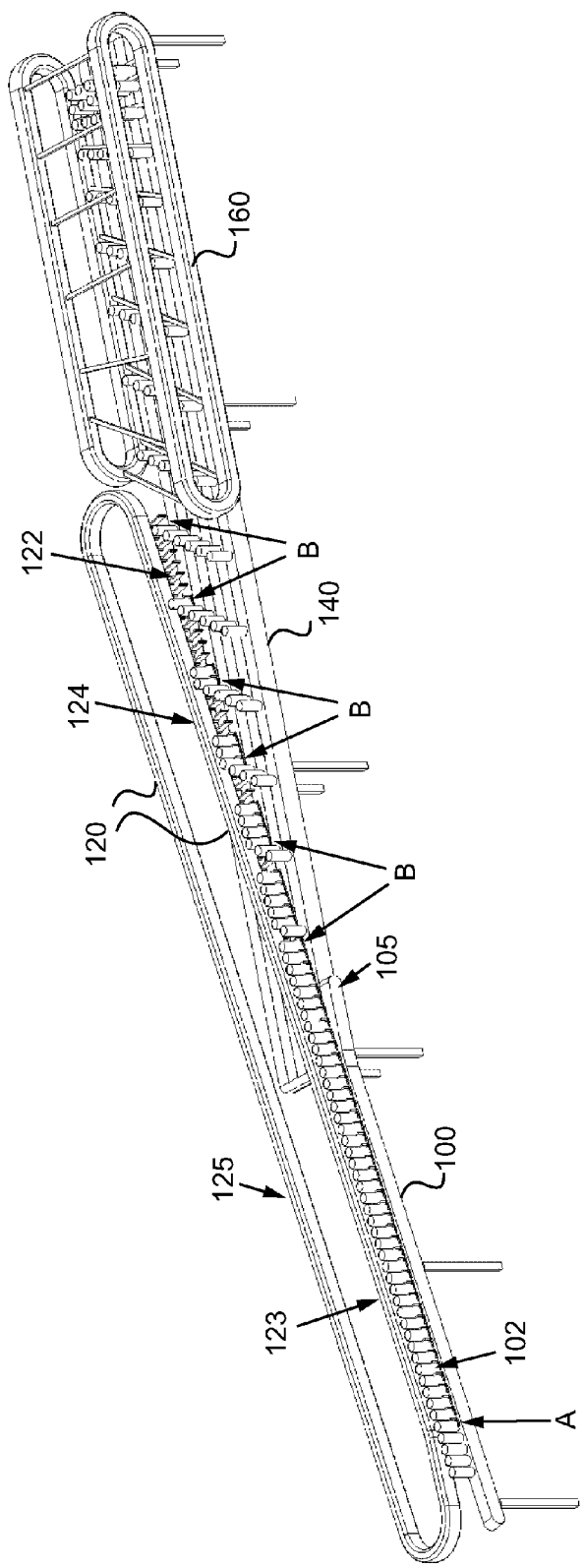
FIG. 1 shows an exemplary embodiment of a device for distributing and grouping containers according to the present invention in a perspective view.

In the figures described hereinafter, like reference numerals denote like elements. For reasons of clarity, like elements are described only upon their first appearance. It is understood, however, that the variants and embodiments of an element described with reference to one of the figures can also be applied to the corresponding elements in the other figures.

FIG. 1 shows an exemplary embodiment of a device for distributing and grouping containers according to the present invention in a perspective view. The device comprises an infeed conveyor 100, a transfer conveyor 120 and an outfeed conveyor 140, where outfeed conveyor 140 in this non-restricting development additionally comprises a device 160 for grouping the containers which shall be described in greater detail below. Transfer conveyor 120 is arranged with respect to infeed conveyor 100 and outfeed conveyor 140 such that the containers can by way of the plurality of circulating guide elements 122 be received from infeed flow 102 and be guided to the conveying lanes of outfeed conveyor 140.

Figure 3:
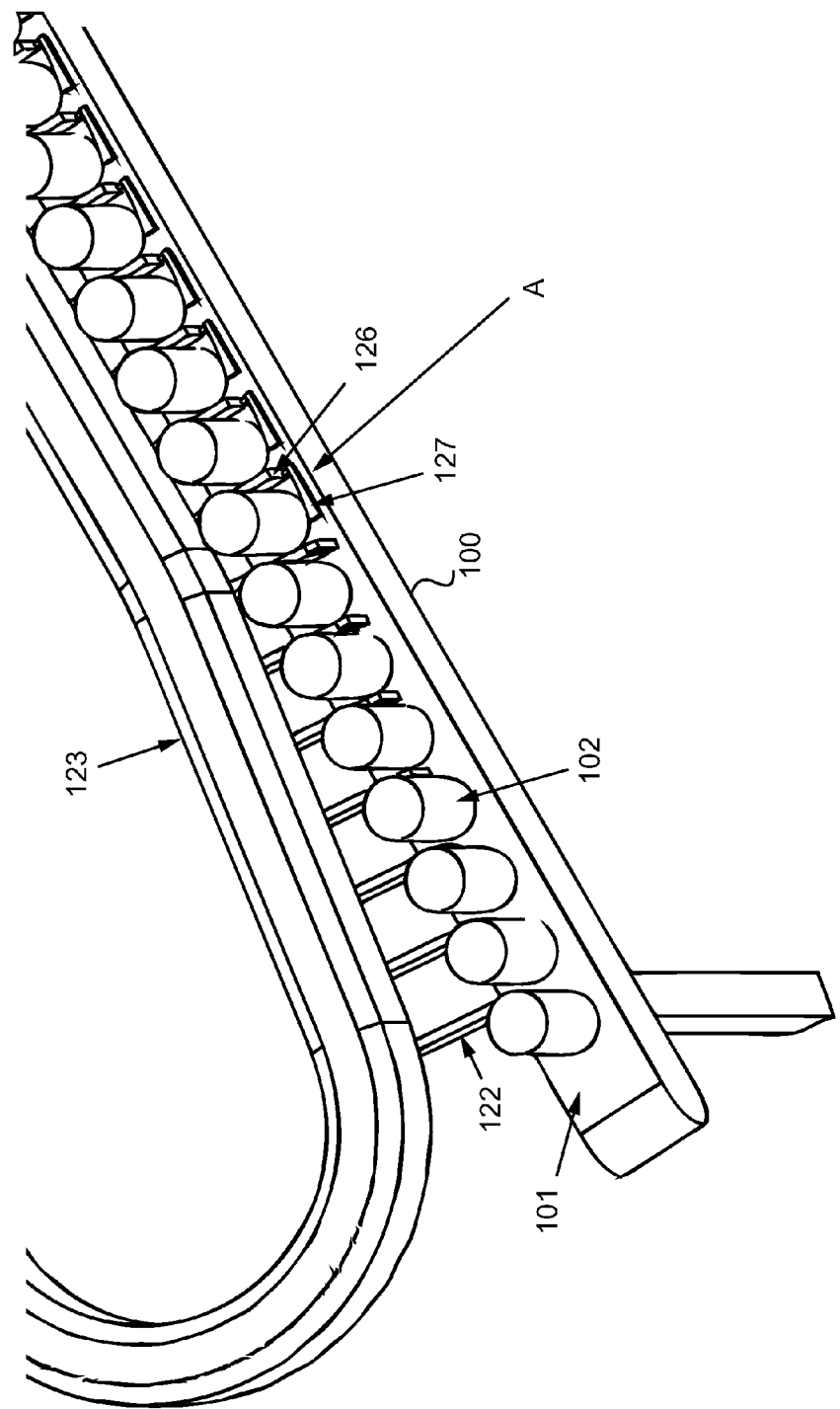
FIG. 3 schematically illustrates reception of the containers by the transfer conveyor from the infeed conveyor.

In the development illustrated by way of example, transfer conveyor 120 comprises a section 123 of the path along which guide elements 122 are moved in synchronism with the containers in the infeed flow and there immerse between successive containers. FIG. 3 schematically illustrates this reception of the container from infeed conveyor 100 by guide elements 122 of the transfer conveyor. Containers 102 are transported in a standing position on a conveyor belt 101 of infeed conveyor 100, where guide elements 122 being moved along section 123 of the path each immerse between two successive containers. This occurs in that section 123 of the path continuously approaches transport track 101. After guide elements 122 have been fully moved into the infeed flow of the containers, they are locked in order to prevent the containers from slipping out prematurely. For this purpose, the guide elements in the development presently shown by way of example in addition to a stop plate 126 comprise a rotary catch 127 which can be flipped, for example, by way of a fixed cam (not shown) on transport track 101. Stop plate 126 can be designed being sufficiently height so that any tilting of the containers running against the stop plate can be prevented. In addition, stop plate 126 and rotary catch 127 of guide elements 122 can be configured such that a plurality of different container types and sizes can be reliably guided with the guide elements.

Guide elements 122 can be driven by way of a belt or chain drive or be attached to conveying devices which are moved individually and independently by use of a long-stator linear motor drive. In the latter case, the occurrence of a gap in infeed flow 102 can be flexibly responded to by adjusting the speeds and positions of the conveying devices. While this is not possible with a belt or chain drive for guide elements 122, the installation and operating costs, however, are reduced with such a drive.

Figure 2:
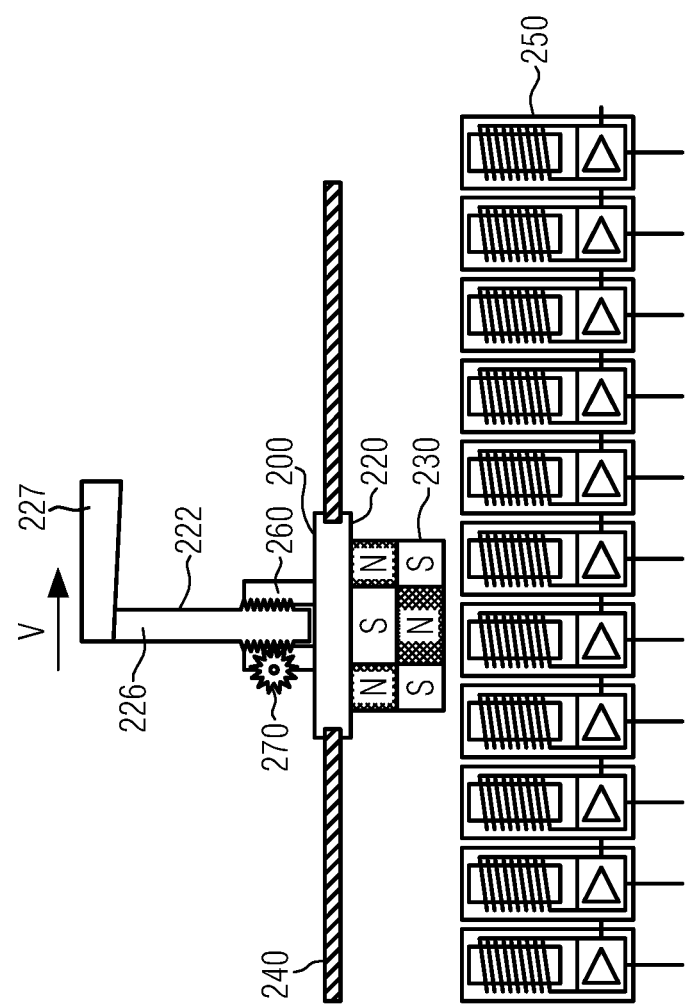
FIG. 2 illustrates an exemplary embodiment of a conveying device and a transport track of a linear motor drive.

FIG. 2 illustrates an exemplary embodiment of a conveying device and a transport track of a linear motor drive. However, the present invention is not restricted to the specific embodiment of the conveying device presently illustrated, but is applicable to any kind of individually movable conveying device having suitable guide elements for guiding the containers. Conveying device 200 presently shown can be guided by a guide rail 240 along the transport track. The conveying device in this particular embodiment is supported by a sliding bearing 220 on guide rail 240. The figure further shows a guide element 222 by use of which the conveying device can detect and guide the container.

Figure 9:
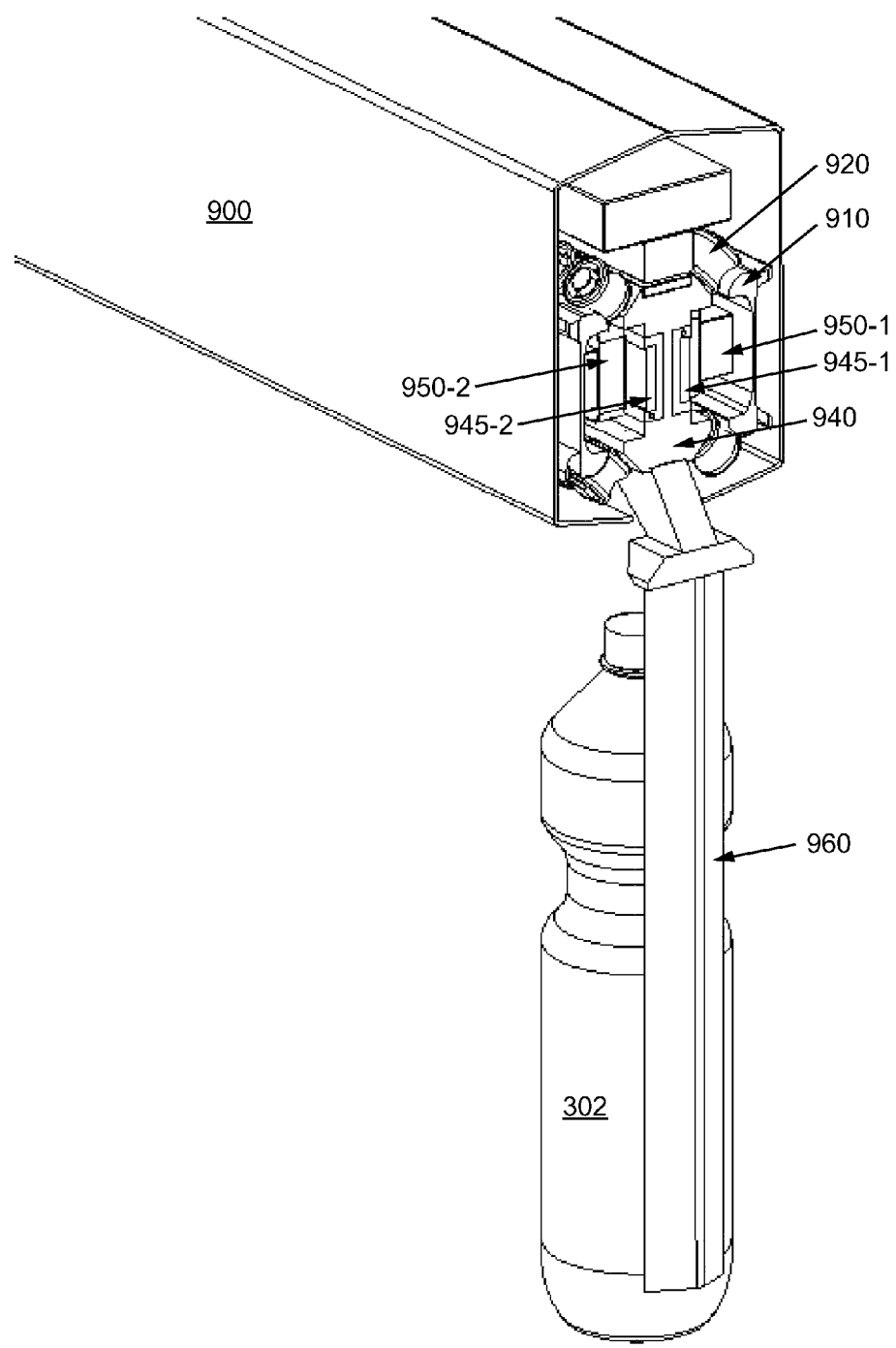
FIG. 9 shows a perspective representation of a long-stator linear motor drive for the push element of FIG. 8.

Guide element 222 is in the exemplary embodiment presently shown configured in the form of a stop bar 226 on which a rotary catch 227 is arranged which can be switched, for example, by cams arranged on the transport track. In the non-restricting embodiment illustrated, rotary catch 227 is connected to stop bar 226, where rotary catch 227 can be rotatably mounted on the stop bar. Alternatively, rotary catch 227 can be associated with the conveying device via an element that is rotatable about its longitudinal axis, in particular stop bar 226 itself. A plurality of alternative developments of guide element 222, such as the push element shown in FIG. 9, is conceivable, depending on the configuration of the containers and the transfer conveyor. In addition, the guide element can, as presently shown, in a manner movable in the longitudinal direction be attached via a support 260 to conveying device 200, where, for example, a sprocket 270 driven by a servo motor (not shown) engages a gear rack of the conveying element. A plurality of alternative configurations for lateral movement of guide element 222 is conceivable. For example, guide element 222 can by way of a spring-resilient element be attached to conveying device 200. By changing the length of the guide element, the device according to the invention can be adjusted to containers of different sizes.

The drive of the passive conveying device presently illustrated is effected by magnetic interaction between response element 230 of the conveying device and a plurality of electrical windings 250 along the transport track. Electrical windings 250 can there by way of a control and/or regulating device (not shown) be driven individually and as electromagnets have the polarity reversed individually. By interaction of the magnetic fields of the electromagnets with the permanent magnets of the conveying devices presently illustrated, the conveying device experiences an action of force which with suitable control of electromagnets 250 leads to an acceleration, deceleration, or uniform movement of the conveying device along guide rail 240. Response element 230 presently shown of the conveying device is by way of example composed of three permanent magnets disposed alternately and perpendicular to the guide rail. A plurality of alternative configurations of response element 230 is there conceivable. As shown in the exemplary development, for example, the width of the central permanent magnet can correspond approximately to the distance between two adjacent electrical windings of the transport track and the width of the outer permanent magnets can each correspond approximately to half the distance of the adjacent electrical windings. With alternating polarity of adjacent electromagnets in the transport track, a maximum force can therefore be exerted upon the response element along the guide rail. By individually controlling electromagnets 250, conveying element 200 can be moved along guide rail 240 at speed V predetermined by a control and/or regulating unit of the transport device. In particular, a plurality of conveying devices can be moved in a controlled manner along the guide rails such that the guide elements carried by them receive individual containers from the infeed flow and selectively guide them to the desired conveying lanes.

As illustrated in FIG. 1, the transfer conveyor in addition to the section 123 of the path for receiving the containers comprises a transfer path or transport path 124, respectively, along which the containers are selectively distributed to the conveying lanes of outfeed conveyor 140, and a return path 125 along which guide elements 122 are returned to section 123 of the path. As already mentioned, this return path 125 can, even when section 123 of the path and transfer path 124 are equipped with a linear motor drive, be equipped with a continuous drive, for example, a belt or chain drive to save installation and operating costs.

The containers are at reception point A received by guide elements 122 of the transfer conveyor from infeed flow 102. This means that the guide elements from this point assume control over the speed and/or the direction of transport of the containers, which was previously determined by conveyor belt 101 of infeed conveyor 100. This can be done, for example, as illustrated by way of example in FIGS. 1 and 3, by locking guide element 122 so that the transport speed of the received containers is determined by the transfer conveyor. However, the reception point can also be provided still farther downstream of infeed conveyor 100. In both cases, the containers are in the illustrated development pushed by guide elements 122 from conveyor belt 101 via a transfer element 105, for example, in the form of a transfer plate, onto the conveyor belts of outfeed conveyor 140. The relative speed of the conveyor belts of outfeed conveyor 140 with respect to the speed of circulation of guide elements 122 can be selected such that containers standing on the conveyor belts are pressed against the stop plates of the guide elements. It can by selectively opening the rotary catch of the guide elements thereby be determined at which position B the respective container is delivered to the outfeed flow.

Figure 4:
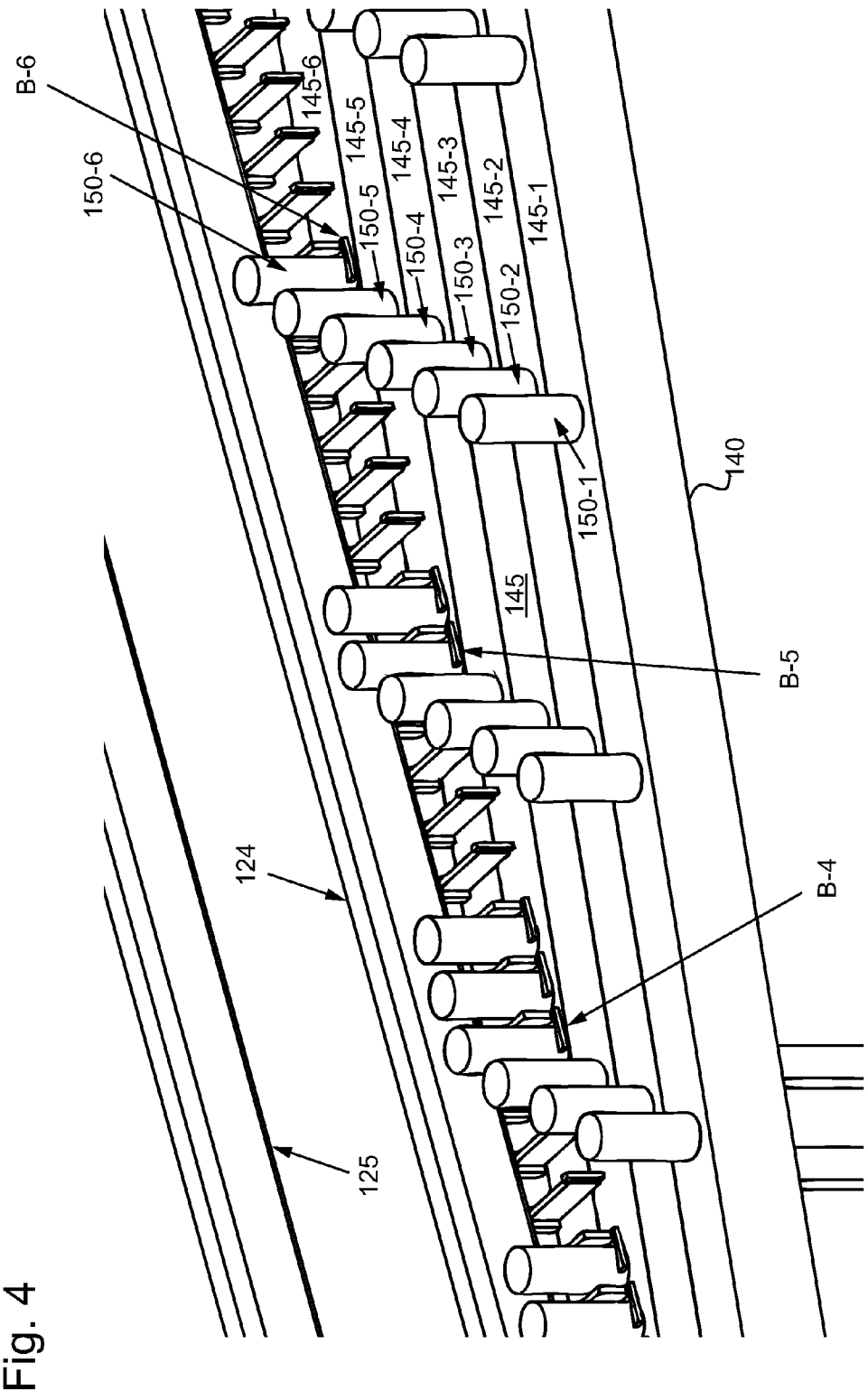
FIG. 4 schematically illustrates delivery of the containers from the transfer conveyor to the outfeed conveyor in a perspective view.
Figure 5:
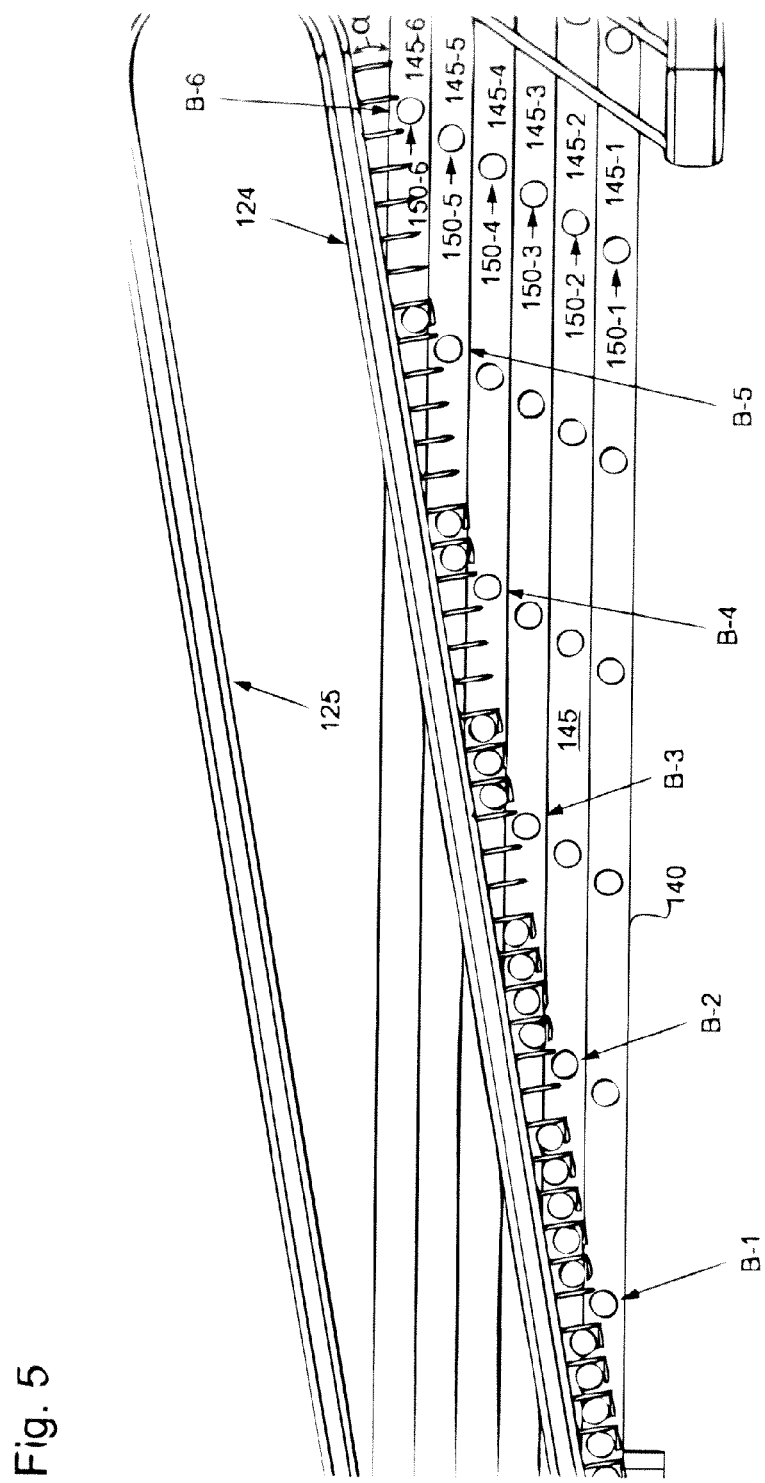
FIG. 5 shows delivery of the containers in a top view.

This process is illustrated in more detail in FIGS. 4 and 5, where FIG. 4 shows a perspective view and FIG. 5 a plan view of transfer path 124. In the non-restricting development presently illustrated, outfeed conveyor 140 comprises six conveying lanes 145-1 to 145-6 disposed parallel to each other. These conveying lanes can there be formed by separate conveyor belts which run next to one another in one plane without any separating elements, or be provided as conveying lanes on a common conveyor belt 145. It is understood that other numbers of conveying lanes are possible depending on which pack sizes are desired. The containers can also be distributed to less than the maximum possible conveying lanes in that the rotary catch of the guide elements is opened only at the respective positions. A variation of the lateral spacing of the conveying lanes is for a common conveyor belt 145 also conceivable by adjusting the positions at which the rotary catch is opened. For this purpose, an electrically switchable locking mechanism for the guide elements suggests itself. Alternatively, the rotary catches can be opened by switchable cams at the delivery positions (not shown).

In the development presently shown, groups of six containers are respectively distributed to each of the six conveying lanes 145-1 to 145-6. This is accomplished in that the respective rotary catch is opened at respective delivery positions B-1 to B-6 so that containers 150-1 to 150-6 are released from the guide elements. In the development presently shown, the conveyor belt or the conveyor belts 145, respectively, are part of outfeed conveyor 140. Transfer conveyor 120, however, can also dispose of its own conveyor belts which then deliver the distributed containers to outfeed conveyor 140.

As seen in FIG. 5, transfer path 124 of the transfer conveyor is disposed obliquely at an acute angle α relative to the direction of the conveying lanes. The angle is there greater than 0° and smaller that 90° so that the containers be guided transversely across conveying lanes 145-1 to 145-6. It is also evident from FIG. 5 that the arrangement of transfer path 124 selected there leads to a longitudinal offset of the delivered containers 150-1 to 150-6 in the conveying direction which must be corrected by downstream grouping device 160. Assuming a uniform speed $v_{out}$ of the containers along conveying lanes 145-1 to 145-6 and a uniform speed $v_{trans}$ of guide elements 122 along transfer path 124, it can with the arrangement of the transfer path at an angle α, satisfying the formula $\cos \alpha = v_{out}/v_{trans}$, be effected that containers 150-1 to 150-6 are delivered to the conveying lanes in a line perpendicular to the conveying direction. The grouping device described farther below can in this case be dispensed with. With separately provided conveyor belts 145 for conveying lanes 145-1 to 145-6, the grouping device described farther below can without the above-described specific selection of the angle be dispensed with if the individual conveyor belts are driven at such different speeds that the longitudinal offset arising during delivery of the containers can again be compensated by the end of the conveyor belts. For example, conveyer belt 145-1 being associated with conveying lane 150-1 would need to be driven at a higher speed than conveyor belt 145-6 associated with conveying lane 150-6. The speeds of the conveyor belts, also of infeed conveyor 100, and the guide elements can be controlled by a control and/or regulating unit (not shown). When using a linear motor drive for the transfer conveyor, guide elements already loaded with containers can be decelerated until a subsequent gap in the infeed flow is closed.

Figure 6:
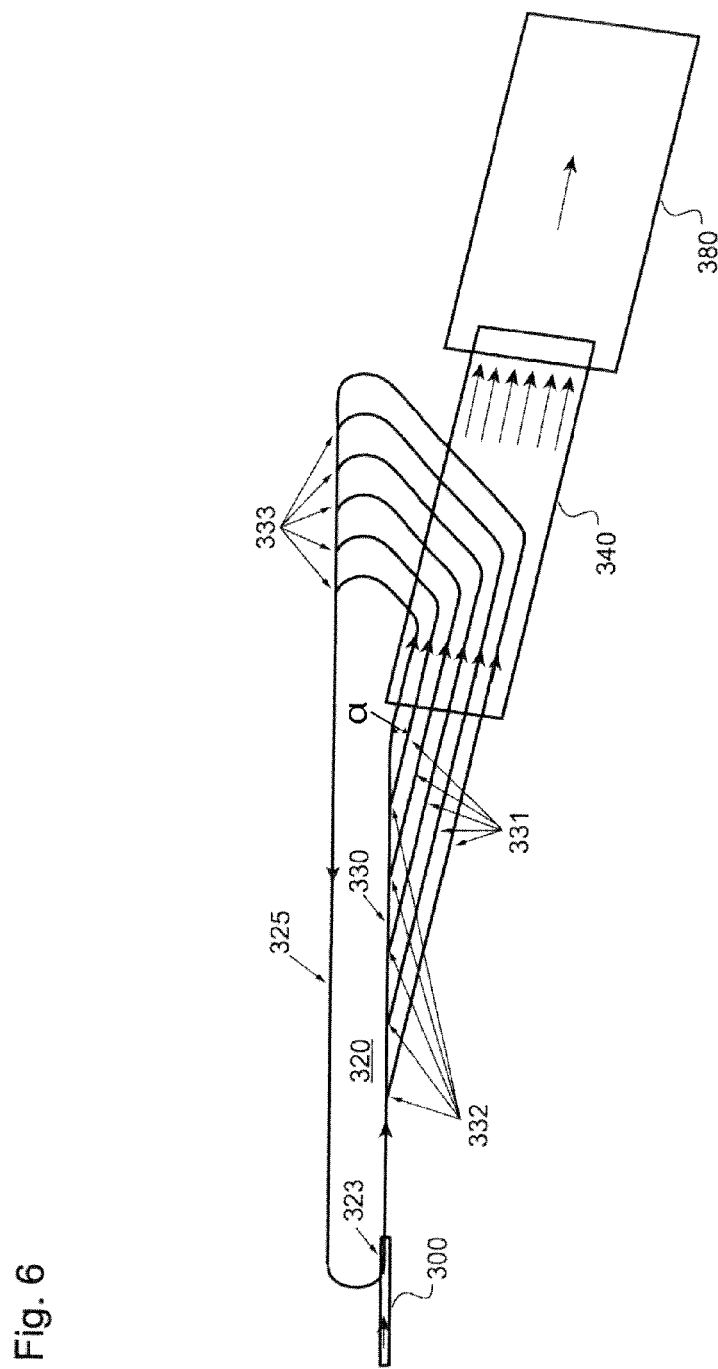
FIG. 6 schematically illustrates an alternative device for distributing and grouping containers with a fan-shaped transfer conveyor according to the present invention.

FIG. 6 schematically illustrates an alternative device for distributing and grouping containers with a fan-shaped transfer conveyor according to the present invention. The device in addition to infeed conveyor 300 and outfeed conveyor 340 in this development comprises a fan-shaped transfer conveyor 320, which drives a plurality of individually and independently movable conveying devices by way of a long-stator linear motor drive. In the transfer conveyor presently shown, the containers are distributed by selectively channeling the respective conveying devices guiding the containers via track switches 332 onto branch lines 331 to the desired conveying lanes of outfeed conveyor 340. For this purpose, the linear motor drive of transfer conveyor 320 in addition to main line 330, which is also associated with an outfeed conveying lane, comprises a number of branch lines 331, each associated with an outfeed conveying lane. Branch lines 331 are there via controllable track switches 332 connected to main line 330 for selectively channeling the conveying devices and via track switches 333 for re-introducing the conveying devices. The re-introduced conveying devices are returned along a return path 325 to section 323 of the path where they receive new containers from the infeed flow of containers.

Figure 7:
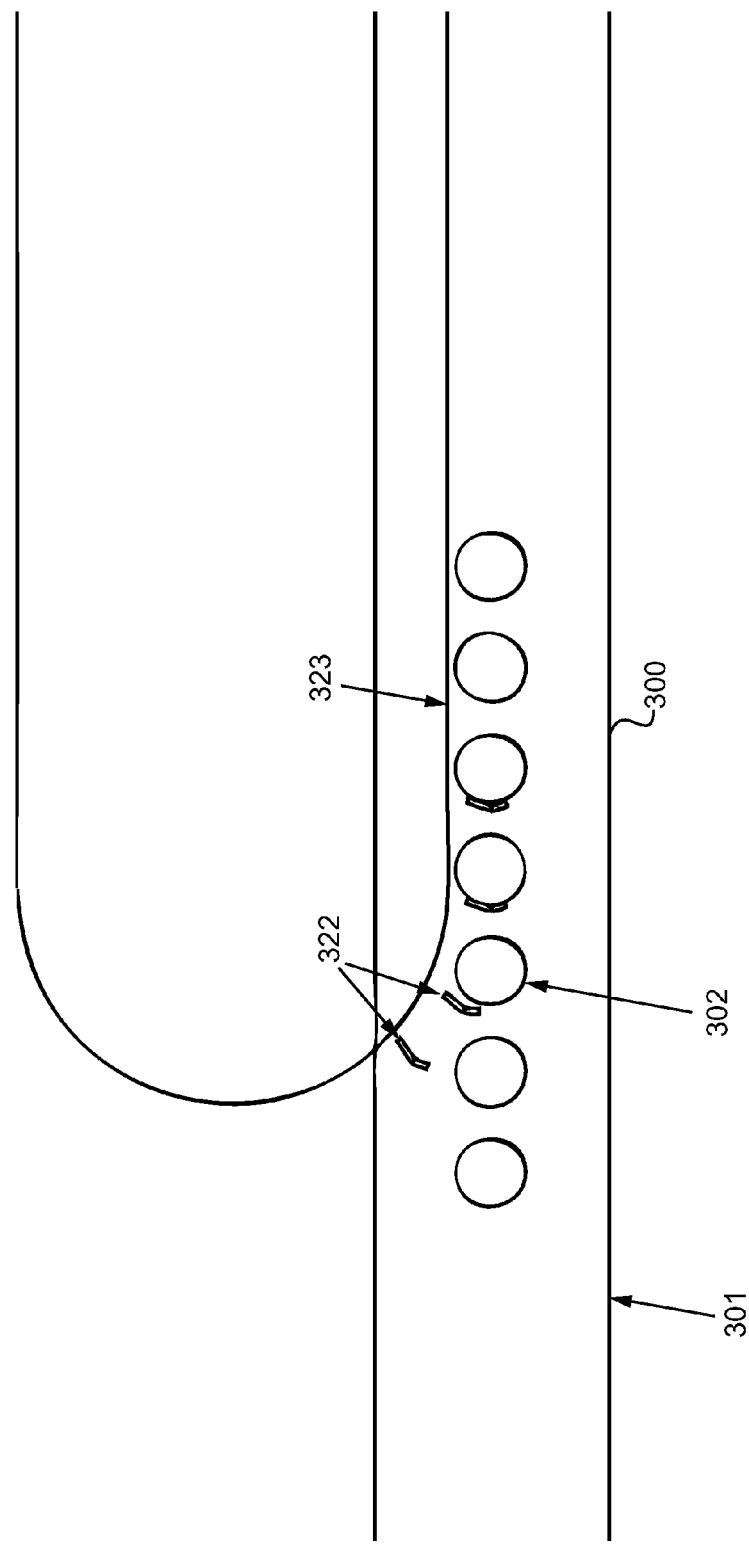
FIG. 7 illustrates reception of the containers by the transfer conveyor of FIG. 6.

Reception of containers 302 from the infeed flow is shown in detail in FIG. 7. Like in the development already shown in FIG. 3, guide elements 322 are also in this development by moving along section 323 of the path approximated to the infeed flow of containers 302, which are moved by a conveyor belt 301 of infeed conveyor 300, such that they are made to mechanically contact the containers. Of the conveying devices and their associated guide elements, only push element 322 is shown in the schematic representation illustrated.

Figure 8:
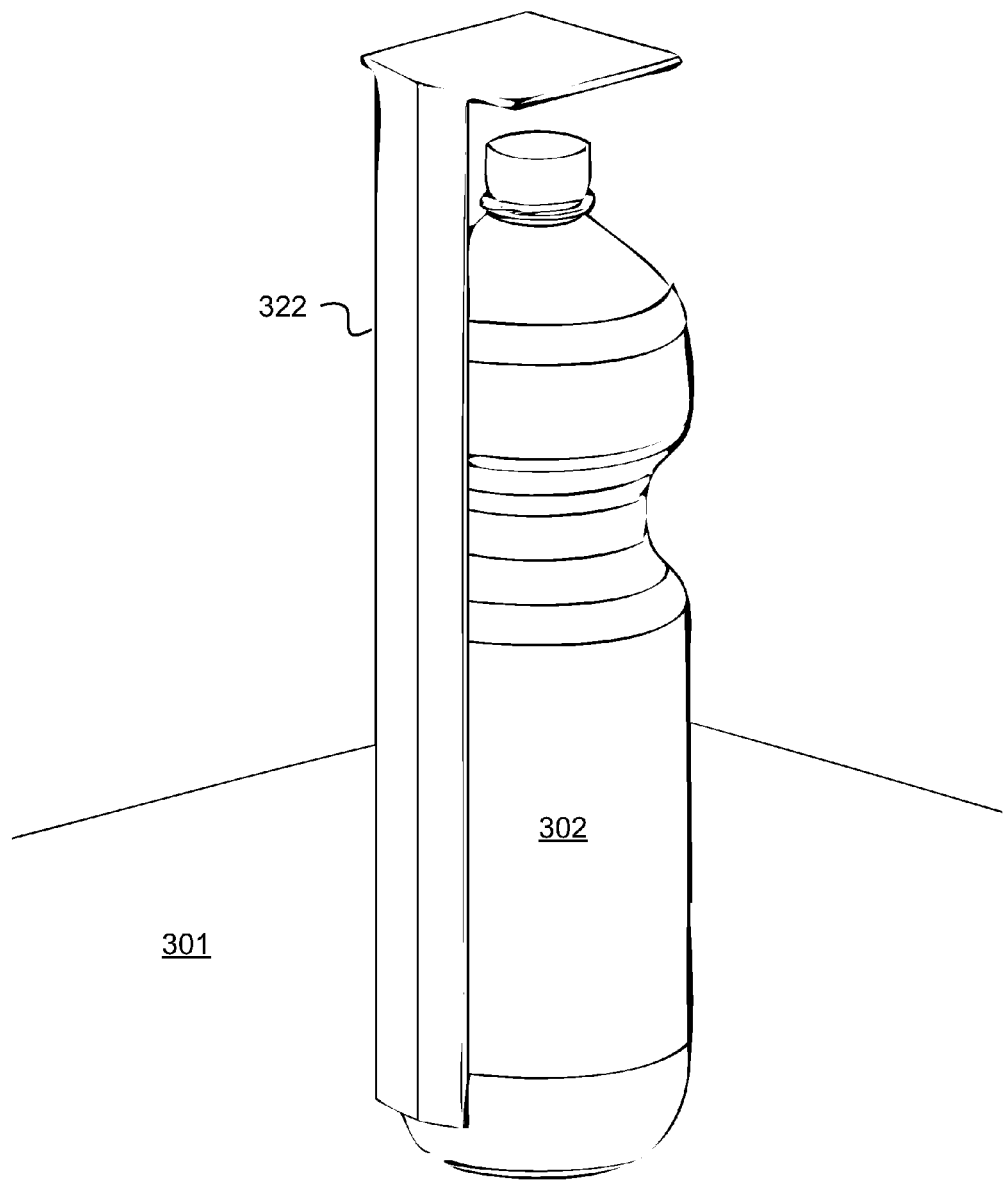
FIG. 8 shows an exemplary push element of the transfer conveyor of FIG. 6.

An exemplary embodiment of the guide elements can be found in FIG. 8. Push element 322 is shown as an extended and angled element which can be made to contact container 302, presently exemplified as a bottle, in a two-dimensional mechanical manner. By driving the conveying device carrying the push element, container 302 can then be selectively pushed over a conveying surface 301, such as a transfer plate or a conveyor belt.

Push elements 322 can be moved by controllably moving the conveying devices by way of the linear motor drive in such a manner relative to the infeed flow of containers 302 that the push elements are introduced selectively into the infeed flow and made to mechanically contact the container sides disposed in the downstream direction. The push elements have an angled configuration, as shown in the figure, to allow guiding the containers in a laterally stable manner.

FIG. 9 shows a perspective view of an exemplary long-stator linear motor drive 900 for the push element of FIG. 8. Push element 960 pushing container 302 is attached to a conveying device 940 being formed as a carriage or a runner. Conveying device 940 is there via rollers 920 supported on rails 910 of the linear motor drive that are equipped with individually controllable long stators 950-1 and 950-2. Conveying device 940 accordingly comprises corresponding magnetic response elements 945-1 and 945-2 which, as described above, can in particular be configured as permanent magnets or non-switching electromagnets. By controlling and/or regulating the strength of current in the electrical windings of long stators 950-1 and 950-2, the conveying devices can be moved selectively and independently with individual distance-time profiles. A control and/or regulating unit (not shown) can there control the movement of the conveying devices and the speeds of the conveyor belts of the infeed and outfeed conveyors. In addition, the control and/or regulating unit can switch track switches 332 of the transfer conveyor such that the containers pushed by push elements 322 are distributed to the outfeed conveying lanes.

Also in FIG. 6, main line 330 of transfer conveyor 320 and the outfeed conveying lanes of outfeed conveyor 340 are arranged at an acute angle. This, however, is not mandatory due to the flexibility of the linear motor drive employed. Instead, also branch lines 331 can be formed as being curved accordingly. In the development presently shown, preferably a transfer plate (not shown) is disposed between infeed conveyor 300 and outfeed conveyor 340. However, the outfeed conveyor can instead also be extended in the region of track switches 332, equivalent to the arrangement in FIG. 1. A variety of alternative developments is conceivable.

Figure 10:
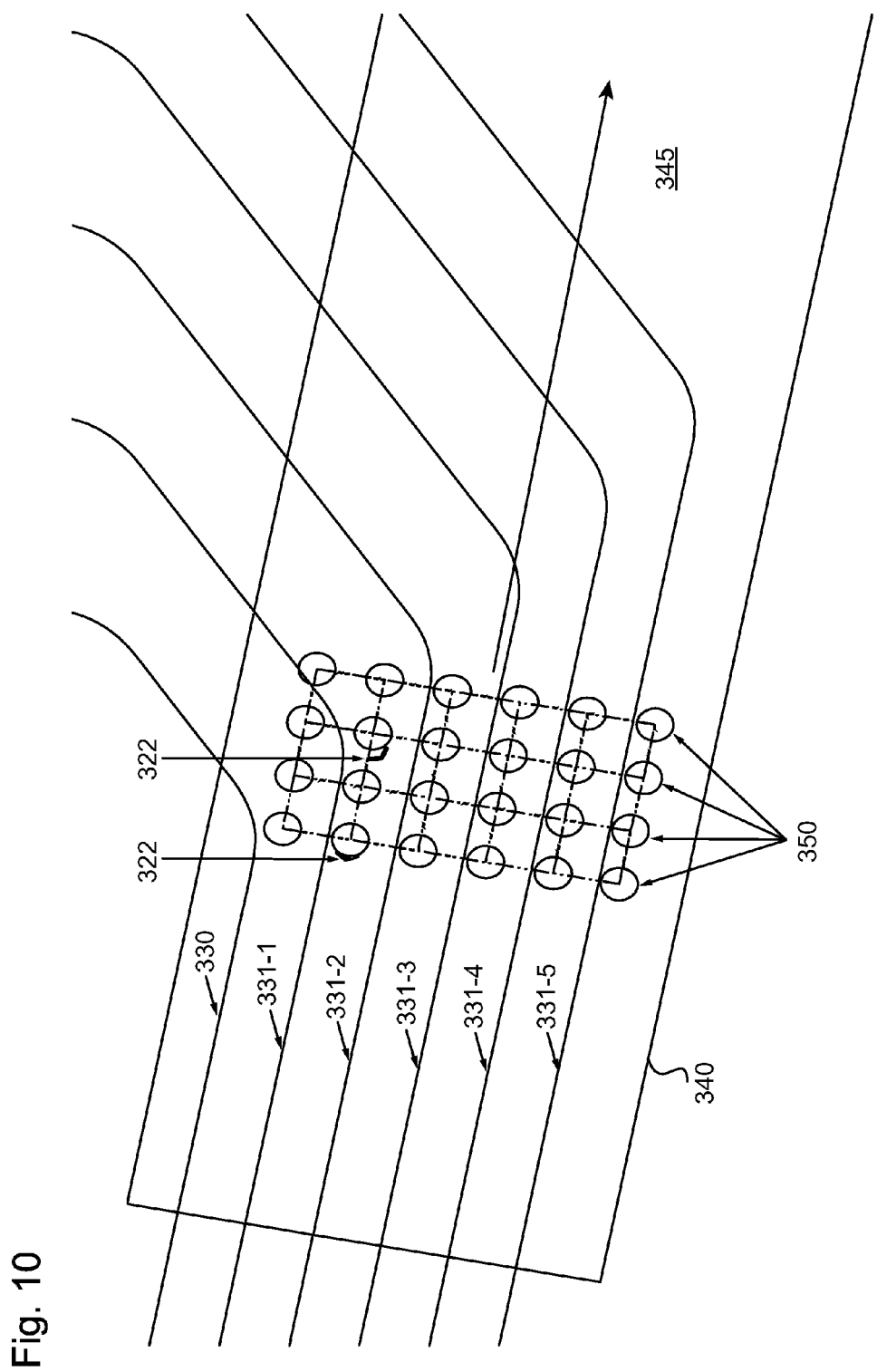
FIG. 10 shows delivery of already grouped containers from the transfer conveyor of FIG. 6 to the outfeed conveyor.

Since the conveying devices can by way of the linear motor drive also be moved independently of each other along branch lines 331, the speeds of the conveying devices can be selected such that the containers carried along are delivered to the outfeed conveyor already in a grouped manner, as shown for example in FIG. 10. This figure shows a block of containers 350 which is guided by the conveying devices with their guide elements 322 on main line 330 or branch lines 331-1 to 331-5, respectively, to conveyor belt 345 of outfeed conveyor 340. The arrangement of branch lines 331-1 to 331-5 in relation to conveyor belt 345 can in particular by suitable curvature of the branch lines be selected such that guide elements 322 can be moved through the gaps between containers 350 of the block out from this block. For this purpose, individual control of the conveying devices is in particular of advantage, like it is possible with a linear motor drive. Unlike the development of FIG. 1, successive rows of containers 350 can already in transfer conveyor 320 be pre-grouped by corresponding fast advancement of the trailing containers to form a block of containers, which can, for example, be consolidated by a downstream disposable goods packer 380 to form a pack. This eliminates the need for downstream consolidation of the groups of containers formed. The grouping device described below is also not required.

Figure 11:
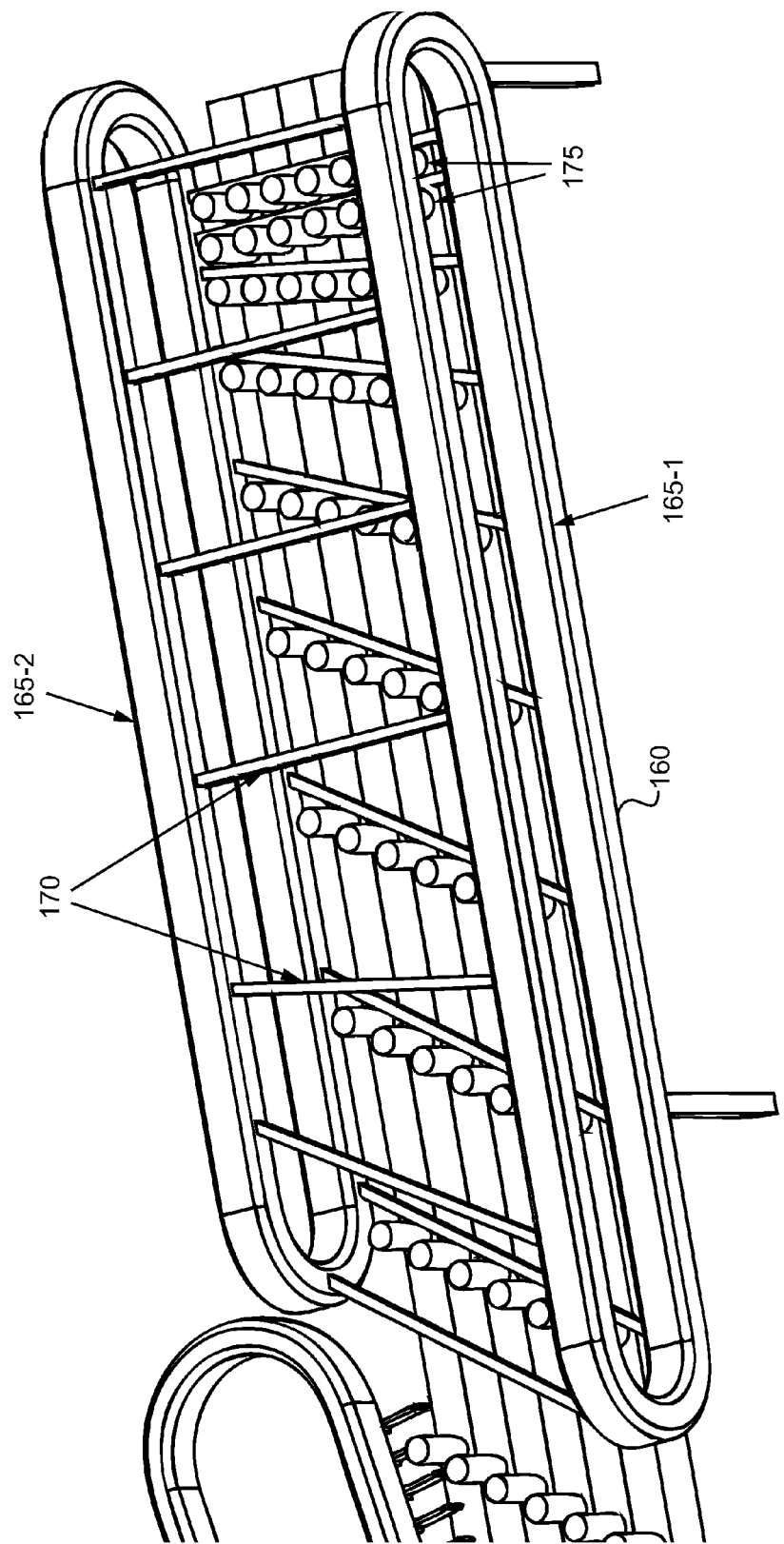
FIG. 11 shows a grouping device for the containers according to the present invention.

FIG. 11 finally shows a grouping device 160 for the containers according to the present invention which can as shown in FIG. 1 be formed as part of outfeed conveyor 140. In the development illustrated, arranged to the left and the right of the conveyor belt or the conveyor belts of outfeed conveyor 140, respectively, are linear motor drives 165-1 and 165-2 disposed substantially parallel to each other, along which a plurality of individually and independently movable conveying devices circulate which are each in pairs connected via cross members 170. For grouping containers transported on the conveying lanes, the pairs of conveying devices can be moved in a controlled manner such that impact bar 170 is placed in front of the containers to be aligned, where an inclined position of the impact bar corresponding to the longitudinal offset of the containers can be achieved by different speeds of movement of the two respective conveying devices. The pair of conveying devices is then moved at a lower speed than the containers so that the latter run into the impact bar. By now moving the leading conveying device of the pair slower than the respective other conveying device, the impact bar is gradually aligned perpendicular to the conveying direction, while the leading containers are decelerated. This ultimately results in a pre-group of containers in lines 175 perpendicular to the conveying direction which can then be passed on, for example, to a push bar chain of a disposable goods packer for the exact formation of the pack formation. Impact bar 170, now no longer being required, is be moved away upwardly with the conveying devices and moved back via the return path to the beginning of the grouping device.

The embodiments described allow for reliable and flexible distribution of a single-lane container flow to a multi-lane outfeed flow, where a plurality of different container types and sizes can be treated without changing format components. A downstream grouping device can align the distributed containers in rows and prepare them for being packaged into packs.

The invention claimed is:

1. A device for distributing and grouping containers in a container treatment assembly, comprising:
   an infeed conveyor which is configured to convey a plurality of containers in a single-lane infeed flow;
   an outfeed conveyor which is configured to convey the containers away in multiple outfeed container lanes; and
   a transfer conveyor associated with the infeed and the outfeed conveyor and having a plurality of circulating guide elements for the containers;
   the transfer conveyor being adapted to separate the containers in a standing position by way of the circulating guide elements from the single-lane infeed flow to the multi-lane outfeed flow by selective guiding;
   the infeed conveyor, the transfer conveyor and the outfeed conveyor being arranged relative to each other such that the containers are transported in the standing position at least between being received from the single-lane infeed flow and delivered to the multi-lane outfeed flow; and
   the transfer conveyor further comprising at least one section of the path which intersects the outfeed conveyor at an angle $\alpha$ which is smaller than 90°.

2. The device according to claim 1, the infeed conveyor comprising a conveyor belt for single-lane transportation of containers.

3. The device according to claim 2, the outfeed conveyor comprising at least one convey or belt.

4. The device according to claim 2, the outfeed conveyor comprising a plurality of conveyor belts arranged in parallel for multi-lane transportation of containers.

5. The device according to claim 1, the transfer conveyor comprising at least one of a group consisting of a long-stator linear motor drive with a plurality of individually and independently movable conveying devices, a belt drive, and a chain drive.

6. The device according to claim 5, the guide elements each having at least one stop element which is adapted such that the at least one stop element by mechanical engagement with at least one container is used for decelerating the container.

7. The device according to claim 6, the stop element being at least one of controllably lockable and controllably unlockable.

8. The device according to claim 5, the transfer conveyor comprising the long-stator linear motor drive and each of the guide elements comprising at least one push element which is configured such that the at least one push element by mechanical engagement with at least one container is used to push forward the container in a laterally stable manner.

9. The device according to claim 8, the transfer conveyor further comprising plurality of controllable track switches connecting a main line of the transfer conveyor to a plurality of branch lines associated with the outfeed container lanes.

10. The device according claim 1, the outfeed conveyor further comprising a pair of long-stator linear motor drives arranged parallel to each other with a plurality of conveying devices connected to each other in pairs by a cross member.

11. The device according to claim 10, the cross member comprising an impact bar.

12. The device according to claim 1, the selective guiding including at least one of pushing the containers forward and decelerating the containers by the guide elements.

13. The device according to claim 1, the outfeed convey or comprising a plurality of conveyor belts arranged in parallel for multi-lane transportation of containers.

14. The device according to claim 1, the angle $\alpha$ being represented approximately by the formula $\cos\alpha = v_{out}/v_{trans}$ with a uniform conveying speed $v_{out}$ of the containers in the outfeed flow and a uniform conveying speed $v_{trans}$ of the containers along the at least one section of the path of the transfer conveyor.

15. A method for distributing and grouping containers in a container treatment assembly, comprising:
   supplying a plurality of containers in a single lane to a transfer conveyor;
   moving the containers by the transfer conveyor along a section of a path which intersects the outfeed container lanes at an angle $\alpha$ which is smaller than 90°;
   conveying the containers away from the transfer conveyor in multiple outfeed container lanes; and
   distributing the containers away from the single-lane infeed flow to the multi-lane outfeed flow by way of the transfer conveyor;

and in distributing the containers, selectively guiding them, while the containers are transported in a standing position, by way of a plurality of circulating guide elements of said transfer conveyor;

wherein the containers are transported in the standing position at least between being received from the single-lane infeed flow and delivered to the multi-lane outfeed flow.

16. The method according to claim 15, and separating the containers by the transfer device when the containers are received from the infeed flow.

17. The method according to claim 15 and in distributing the containers, distributing them by way of a long-stator linear motor drive with at least one of a group consisting of a plurality of individually and independently movable conveying devices, a belt drive, and a chain drive.

18. The method according to claim 17, at least some of the plurality of individually and independently movable conveying devices being, by a plurality of controllable track switches, fed out from a main line of the transfer conveyor to a plurality of branch lines associated with the outfeed container lanes.

19. The method according to claim 15, and in distributing the containers, the guiding includes at least one of pushing the containers forward and decelerating the containers.

20. The method according to claim 19, where the containers are at least one of decelerated by mechanical engagement of at least one stop element of the guide elements, or pushed forward by mechanical engagement of at least one push element of the guide elements.

21. The method according to claim 15, and feeding the containers out in multiple lanes by way of a pair of long-stator linear motor drives, the long-stator linear motor drives disposed parallel to each other and having a plurality of conveying devices connected to each other in pairs by a cross member.

22. The method according to claim 21, and in feeding the containers out in multiple lanes by way of the pair of long-stator linear motor drives, the cross-member is an impact bar.

23. The method according to claim 21, and in feeding the containers out in multiple lanes by way of the pair of long-stator linear motor drives, in addition to the cross-member, additional cross-members are provided to connect the pair of long-stator linear motor drives to one another, and the cross-members are at least one of a group consisting of aligned perpendicular to the transport track, decelerated, buffered, and grouped.

24. The method according to claim 15, and in moving the containers by the transfer conveyor, the angle $\alpha$ is represented approximately by the formula $\cos \alpha = v_{out}/v_{trans}$ with a uniform conveying speed $v_{out}$ of the containers in the outfeed flow and a uniform conveying speed $v_{trans}$ of the containers along the section of the path of the transfer conveyor.

25. A device for distributing and grouping containers in a container treatment assembly, comprising:
an infeed conveyor which is configured to convey a plurality of containers in a single-lane infeed flow;
an outfeed conveyor which is configured to convey the containers away in multiple outfeed container lanes; and
a transfer conveyor associated with the infeed and the outfeed conveyor and having a plurality of circulating guide elements for the containers;
the transfer conveyor being adapted to separate the containers in a standing position by way of the circulating guide elements from the single-lane infeed flow to the multi-lane outfeed flow by selective guiding,
the transfer conveyor further comprising at least one section of the path which intersects the outfeed conveyor at an angle $\alpha$ which is smaller than 90°, and
the angle $\alpha$ being represented approximately by the formula $\cos \alpha = v_{out}/v_{trans}$ with a conveying speed $v_{out}$ of the containers in the outfeed flow and a conveying speed $v_{trans}$ of the containers along the at least one section of the path of the transfer conveyor.

\* \* \* \* \*